US008872810B2

(12) United States Patent
Väänänen et al.

(10) Patent No.: US 8,872,810 B2
(45) Date of Patent: Oct. 28, 2014

(54) COMBINED DIGITAL MODULATION AND CURRENT DIMMING CONTROL FOR LIGHT EMITTING DIODES

(75) Inventors: Ari K. Väänänen, Oulu (FI); Mauri K. Määttä, Oulu (FI); T. Tapani Tuikkanen, Oulu (FI)

(73) Assignee: National Semiconductor Corporation, Santa Clara, CA (US)

(*) Notice: Subject to any disclaimer, the term of this patent is extended or adjusted under 35 U.S.C. 154(b) by 917 days.

(21) Appl. No.: 12/925,030

(22) Filed: Oct. 12, 2010

(65) Prior Publication Data

US 2012/0086701 A1 Apr. 12, 2012

(51) Int. Cl.

*G06F 3/038* (2013.01)
*H05B 33/08* (2006.01)
*G09G 3/34* (2006.01)

(52) U.S. Cl.

CPC ...... *H05B 33/0848* (2013.01); *G09G 2320/064* (2013.01); *G09G 2360/144* (2013.01); *G09G 2320/0633* (2013.01); *G09G 3/3406* (2013.01)
USPC ............ 345/214; 345/82; 345/102; 345/212; 315/307; 315/169.3; 315/169.1

(58) Field of Classification Search

CPC .................. G09G 2330/021; G09G 2320/043; G09G 2320/041; G09G 3/20
USPC ......... 345/102, 82, 212, 214; 315/307, 169.3, 315/169.1
See application file for complete search history.

(56) References Cited

U.S. PATENT DOCUMENTS

| | | | |
|---|---|---|---|
| 5,396,188 | A | 3/1995 | Aoki |
| 5,420,499 | A | 5/1995 | DeShazo |
| 6,084,465 | A | 7/2000 | Dasgupta |
| 6,239,654 | B1 | 5/2001 | Yamamoto |
| 6,583,609 | B1 | 6/2003 | Pardoen |
| 6,606,257 | B2 | 8/2003 | Bourdillon |
| 6,683,419 | B2 | 1/2004 | Kriparos |

(Continued)

OTHER PUBLICATIONS

"LM3402/LM3402HV, 0.5A Constant Current Buck Regulator for Driving High Power LEDs", National Semiconductor Corporation, Dec. 2, 2008, 24 pages.

(Continued)

*Primary Examiner* — Shaheda Abdin
(74) *Attorney, Agent, or Firm* — Andrew Viger; Frederick J. Telecky, Jr.

(57) ABSTRACT

A method includes providing an input signal identifying a desired brightness for one or more LEDs to first and second parallel control paths. The method also includes generating a digital modulation control signal using the first control path, generating a current control signal using the second control path, and driving the one or more LEDs using the control signals. The method further includes performing compensation in at least one of the control paths to compensate for an increased efficiency of the one or more LEDs. Generating the control signals could include (i) adjusting the digital modulation control signal while maintaining the current control signal at a substantially constant value for a range of lower LED brightness values and (ii) adjusting the current control signal while maintaining the digital modulation control signal at a maximum value or within a range of maximum values for a range of higher LED brightness values.

20 Claims, 7 Drawing Sheets

(56) References Cited

U.S. PATENT DOCUMENTS

| | | | | |
|---|---|---|---|---|
| 6,784,728 | B2 | 8/2004 | Fischer | |
| 6,844,760 | B2 | 1/2005 | Koharagi et al. | |
| 6,871,289 | B2 | 3/2005 | Pullen et al. | |
| 6,987,787 | B1 | 1/2006 | Mick | |
| 7,058,373 | B2 | 6/2006 | Grigore | |
| 7,115,888 | B2 | 10/2006 | Hachiya et al. | |
| 7,132,820 | B2 | 11/2006 | Walters et al. | |
| 7,221,134 | B1 | 5/2007 | Ling | |
| 7,388,359 | B1 | 6/2008 | Ling | |
| 7,425,819 | B2 | 9/2008 | Isobe | |
| 7,443,209 | B2 | 10/2008 | Chang | |
| 7,535,183 | B2 | 5/2009 | Gurr | |
| 7,579,819 | B1 | 8/2009 | Ling | |
| 7,595,622 | B1 | 9/2009 | Tomiyoshi et al. | |
| 7,642,734 | B2 | 1/2010 | De Anna | |
| 7,671,573 | B1 | 3/2010 | Ling et al. | |
| 7,825,644 | B1 | 11/2010 | Ling | |
| 2003/0234621 | A1 * | 12/2003 | Kriparos | 315/224 |
| 2005/0073263 | A1 * | 4/2005 | Havlik et al. | 315/169.3 |
| 2007/0132439 | A1 | 6/2007 | Tsuzaki | |
| 2008/0278138 | A1 | 11/2008 | Wei | |
| 2009/0267573 | A1 | 10/2009 | Chien et al. | |

OTHER PUBLICATIONS

"LM3404/04HV, 1.0A Constant Current Buck Regulator for Driving High Power LEDs", National Semiconductor Corporation, Dec. 2, 2008, 24 pages.

"Simple Switcher® Synchronous 1MHz 1.5A Step-Down Voltage Regulator", National Semiconductor Corporation, Dec. 1, 2009, 18 pages.

Tawen Mei, et al., "Circuit and Method for Average-Current Regulation of Light Emitting Diodes", U.S. Appl. No. 11/703,981, filed Feb. 8, 2007.

"PWM LED Driver and Boost, Flyback and SEPIC Controller", Linear Technology Corporation 2005, 24 pages.

"Constant Current LED Driver with Digital and PWM Brightness Control", Texas Instruments, Nov. 2004, 25 pages.

Prathyusha Narra, et al., "An Effective LED Dimming Approach", 2004 IEEE, p. 1671-1676.

T. Suntio et al., "Dynamic Effects of Inductor Current Ripple in Average Current Mode Control", 2001 IEEE, pp. 1259-1264.

Zaohong Yang et al., "DC-To-DC Buck Converters with Novel Current Mode Control", 1999 IEEE, pp. 1158-1164.

LIk-Kin Wong, et al., "On/Off Time Modulation for Constant On-Time and Constant Off-Time Switching Regulators", U.S. Appl. No. 12/858,021, filed Feb. 1, 2010.

"LM3405 1.6MHz, 1A Constant Current Buck Regulator for Powering LEDs", National Semiconductor Corporation, Feb. 2007, 20 pages.

Issac Kuan-Chun Hsu, et al., "Compact and Efficient Driver for Multiple Light Emitting Diodes (LEDs)", U.S. Appl. No. 12/800,755, filed May 21, 2010.

Hok-Sun Ling, "Dynamic Current Equalization for Light Emitting Diode (LED) and Other Applications", U.S. Appl. No. 12/799,611, filed Apr. 28, 2010.

Lik-Kin Wong, et al., "Sensing Capacitor for Constant On-Time and Constant Off-Time Switching Regulators", U.S. Appl. No. 12/661,646, filed Mar. 22, 2010.

Lik-Kin Wong, et al., "Driving System With Inductor Pre-Charging for LED Systems With PWM Dimming Control or Other Loads", U.S. Appl. No. 12/800,875, filed May 25, 2010.

Oh, In-Hwan "An Analysis of Current Accuracies in Peak and Hysteretic Current Controlled Power LED Drivers", IEEE, 2008, p. 572-577.

Hai Chen, et al., "Balanced Hysteretic Control of a Regulator for Fast Response, High Efficiency, Precise Constant Output", U.S. Appl. No. 12/660,316, filed Feb. 24, 2010.

"Step-Down 1A LED Driver", Linear Technology Corporation 2005, 20 pages.

* cited by examiner

COMBINED DIGITAL MODULATION AND CURRENT DIMMING CONTROL FOR LIGHT EMITTING DIODES

TECHNICAL FIELD

This disclosure is generally directed to control of light emitting diodes (LEDs). More specifically, this disclosure relates to combined digital modulation and current dimming control for LEDs.

BACKGROUND

Many devices, such as laptop computers and mobile telephones, use light emitting diodes (LEDs) to generate illumination. For example, LEDs are often used to generate backlighting, which illuminates a liquid crystal display (LCD) screen. The amount of backlighting is typically controllable by varying the brightness of the LEDs. Ideally, the operation of the LEDs is optimized so that the LEDs consume as little power as possible while still providing the desired level of illumination.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
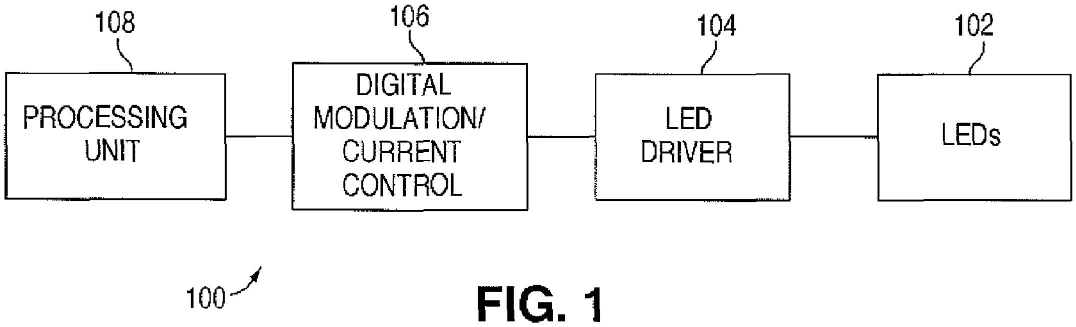
FIG. 1 illustrates an example system for combined digital modulation and current dimming control of light emitting diodes (LEDs) according to this disclosure.

FIG. 1 illustrates an example system 100 for combined digital modulation and current dimming control of light emitting diodes (LEDs) according to this disclosure. As shown in FIG. 1, the system 100 includes one or more LEDs 102. Each LED 102 represents any suitable semiconductor structure for generating visible light or other illumination. Any number of LEDs 102 with any suitable configuration could be used in the system 100. For example, the LEDs 102 could form part or all of a display in a mobile telephone, a display in a laptop computer, a desktop computer monitor, or other display device. In particular embodiments, multiple LEDs 102 are used to generate backlighting for a display device.

An LED driver 104 drives the LEDs 102 and causes the LEDs 102 to generate illumination. For example, the LED driver 104 could repeatedly turn the LEDs 102 on and off at a specified duty cycle. The LED driver 104 could also control the peak current through the LEDs 102, the average current through the LEDs 102, or some other aspect of the LEDs 102. The LED driver 104 includes any suitable structure for driving one or more LEDs.

A digital modulation and current control unit 106 controls the operation of the LED driver 104 in order to control the LEDs 102. In particular, the control unit 106 uses both digital modulation and current control to adjust the brightness of the LEDs 102. For example, as described in more detail below, the control unit 106 can adjust the duty cycle of a pulse width modulation (PWM) control signal in order to adjust the brightness of the LEDs 102 at lower brightness values. At higher brightness values, the control unit 106 can use current control to adjust the brightness of the LEDs 102. Moreover, the control unit 106 can perform this dual digital modulation and current control transparently using a single input signal, such as a single PWM input signal. In addition, the control unit 106 can perform compensation to help ensure that the brightness of the LEDs 102 is at least substantially related linearly to the input signal. The control unit 106 includes any suitable structure for controlling LEDs using both digital modulation and current control. An example embodiment of the control unit 106 is shown in FIG. 2, which is described below.

In this example, the input signal is provided to the control unit 106 by a processing unit 108. The processing unit 108 controls the brightness of the LEDs 102 by providing the PWM or other input signal to the control unit 106. As noted above, the control unit 106 can use that input signal to perform split digital modulation and current control for the LEDs 102. The processing unit 108 could control the brightness of the LEDs 102 using any suitable criteria. For example, a user could set the desired backlighting to be produced by the LEDs 102, and a sensor can detect the amount of ambient light striking a display screen. The processing unit 108 could then adjust the duty cycle of a PWM input signal sent to the control unit 106, allowing the processing unit 108 to dim or brighten the backlighting based on existing lighting conditions. The processing unit 108 includes any suitable structure for controlling the brightness of LEDs, such as a microprocessor, microcontroller, digital signal processor, field programmable gate array, or application-specific integrated circuit.

Although FIG. 1 illustrates one example of a system 100 for combined digital modulation and current dimming control of LEDs, various changes may be made to FIG. 1. For example, the functional division shown in FIG. 1 is for illustration only. Various components in FIG. 1 could be omitted, combined, or further subdivided and additional components could be added according to particular needs. As a specific example, the control unit 106 could receive an input signal from any suitable source. Also, in the above description and in the following description, PWM control may be described as the digital modulation technique used at lower brightness values. However, other digital modulation techniques could be used, such as sigma-delta modulation or pulse frequency modulation. In addition, FIG. 1 illustrates one operational environment where combined digital modulation and current dimming control of LEDs can be used. This functionality could be used in any other suitable device or system.

Figure 2:
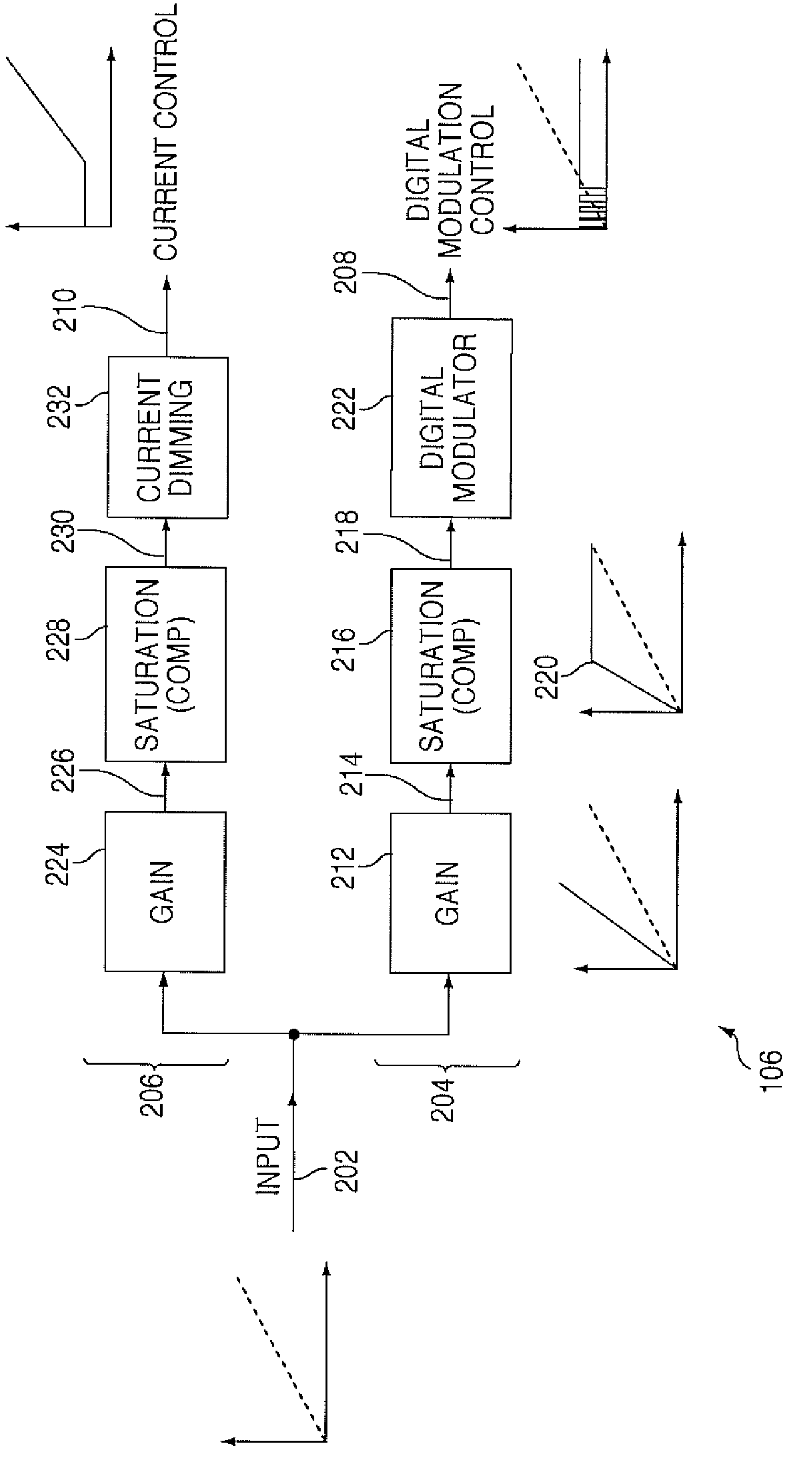
FIG. 2 illustrates an example digital modulation and current dimming control unit for LEDs according to this disclosure.

FIG. 2 illustrates an example digital modulation and current dimming control unit 106 for LEDs 102 according to this disclosure. As shown in FIG. 2, the control unit 106 receives an input signal 202. The input signal 202 could ideally have a linear relationship with the output brightness of the LEDs 102. For example, the duty cycle of a PWM input signal 202 could vary between 0% and 100%, and the brightness of the LEDs 102 could ideally vary linearly with the duty cycle of the PWM input signal 202. The input signal 202 could come from any suitable source, such as the processing unit 108 or other component.

The input signal 202 here is split and provided to two different control paths 204-206 in the control unit 106. The path 204 represents a digital modulation control path that adjusts a digital modulation control signal 208, and the path 206 represents a current control path that adjusts a current control signal 210. In this example, the digital modulation control path 204 includes a gain unit 212, which applies a gain to the input signal 202. This effectively adjusts the slope of the input signal 202 (such as by increasing the slope) to generate a gain-adjusted signal 214. For a PWM input signal 202, the gain unit 212 could increase the duty cycle of the input signal 202. The gain unit 212 includes any suitable structure for applying a gain to a signal.

The gain-adjusted signal 214 is provided to a saturation unit 216, which saturates the signal to generate a saturated signal 218. The signal 218 saturates or hits a maximum value at a specified point 220, after which the signal 218 could remain substantially steady. The specified point 220 may represent the brightness below which digital modulation control is used and above which current control is used. Note, however, that in some regions both digital modulation and current control could be used, such as when digital modulation supports compensation at higher brightness. As described below, compensation can also be performed by the saturation unit 216 to help ensure that the output brightness of the LEDs 102 is at least substantially related linearly to the input signal 202. The saturation unit 216 includes any suitable structure for saturating a signal and optionally for performing compensation.

The saturated signal 218 is provided to a digital modulator 222, which generates the digital modulation control signal 208. The digital modulation control signal 208 could have a duty cycle or other modulated value based on the saturated signal 218. For example, the digital modulation control signal 208 could have a variable duty cycle prior to the point 220 and a duty cycle of 90%-100% past the point 220 where the saturated signal 218 is saturated (although compensation could vary the duty cycle in the 90%-100% region). The digital modulator 222 includes any suitable structure for generating a modulated signal, such as a PWM generator that can generate a PWM signal.

In this example, the current control path 206 includes a gain unit 224, which applies a gain to the input signal 202. This effectively adjusts the slope of the input signal 202 (such as by increasing the slope) to generate a gain-adjusted signal 226. The gain unit 224 includes any suitable structure for applying a gain to a signal. The gain applied by the gain unit 224 could be the same as or different from the gain applied by the gain unit 212.

The gain-adjusted signal 226 is provided to a saturation unit 228, which saturates the signal to generate a saturated signal 230. In this case, the saturation unit 228 saturates the signal 226 at some minimum value. This minimum value can be chosen so that LED optical efficiency is increased as much as possible, but other LED characteristics (such as wavelength and matching) do not suffer significantly. The saturation unit 228 can also perform compensation, which can be performed to help ensure that the output brightness of the LEDs 102 is at least substantially related linearly to the input signal 202. The saturation unit 228 includes any suitable structure for saturating a signal and optionally for performing compensation.

The saturated signal 230 is provided to a current dimming unit 232, which generates the current control signal 210. The current control signal 210 adjusts the amount of current flowing through the LEDs 102 to control the brightness of the LEDs 102. The current control signal 210 could remain substantially constant over a range of lower brightness values, during which time the brightness of the LEDs 102 can be adjusted by the digital modulation control signal 208. At higher brightness values, the brightness of the LEDs 102 is adjusted by the current control signal 210. The current dimming unit 232 includes any suitable structure for controlling current through LEDs.

As shown in FIG. 2, the dual use of digital modulation and current dimming control can occur transparently. The control unit 106 can receive a standard input signal 202 that identifies a desired brightness of the LEDs 102, such as a PWM input signal with a duty cycle identifying the desired brightness. The control unit 106 can then split the input signal 202 in order to generate both the digital modulation control signal 208 and the current control signal 210. This allows both digital modulation and current dimming control to occur at the same time, without requiring modification to the system or device providing the input signal 202.

Figure 3:
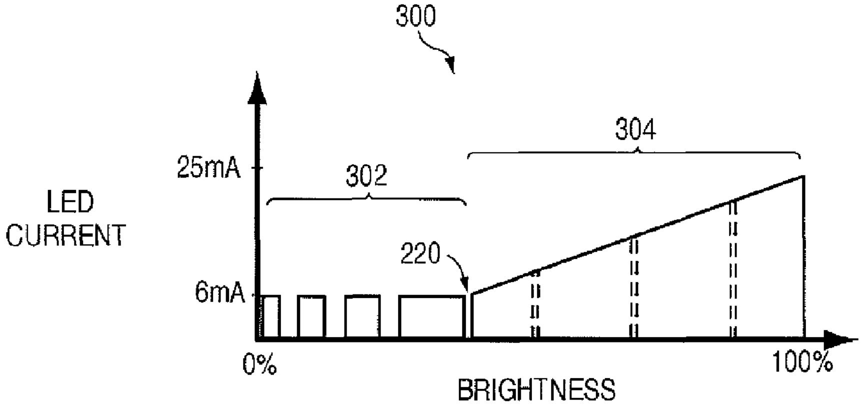
FIGS. 3 through 5 illustrate example characteristics of LED illumination using combined digital modulation and current dimming control according to this disclosure.
Figure 4:
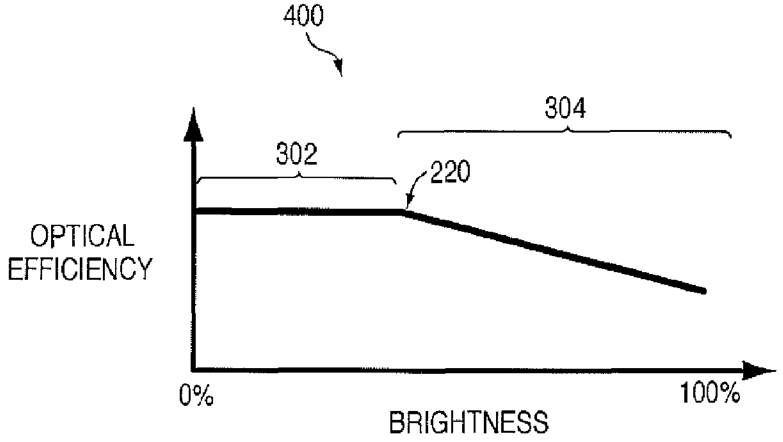
Figure 5:
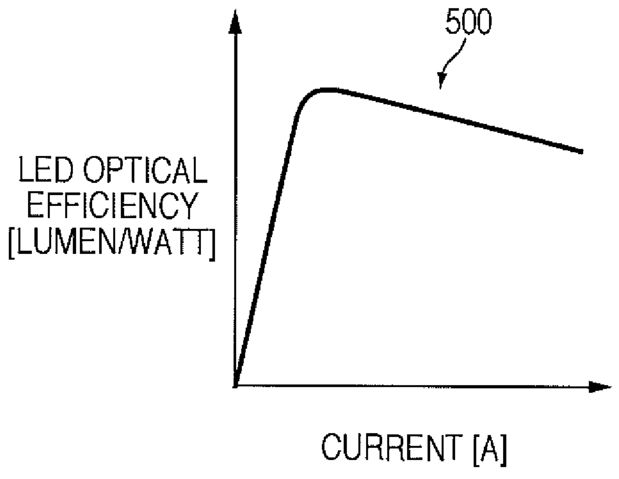

FIGS. 3 through 5 illustrate example characteristics of LED illumination using combined digital modulation and current dimming control according to this disclosure. In FIG. 3, a graph 300 plots the output current through the LEDs 102 when the input signal 202 is swept from 0% to 100%. In FIG. 4, a graph 400 plots the output brightness of the LEDs 102 against the optical efficiency of the LEDs 102.

Within a first range 302 of brightness values, digital modulation control is used, while the current through the LEDs 102 remains relatively constant. Many LEDs 102 have their highest optical efficiency, meaning they can generate the highest lumens per watt, when the current through the LEDs 102 is around 25% of their rated value (in this case, around 6 mA). An example of this is shown in FIG. 5, where a graph 500 plots an LED's optical efficiency against its current. For these types of LEDs 102, that current is used at lower brightness values, and the actual brightness of the LEDs 102 is varied using digital modulation control as shown in FIG. 3. As a result, the LEDs 102 may be operating at or near maximum optical efficiency during this time as shown in FIG. 4.

Within a second range 304 of brightness values, current control is used to adjust the current through the LEDs 102, while the digital modulation control signal is generally above a specified duty cycle (such as 90%) as shown in FIG. 3. During this time, the optical efficiency of the LEDs 102 drops as shown in FIG. 4, but the LED current can increase in order to achieve higher brightness. The LED current could increase up to a maximum value, such as around 25 mA.

In FIGS. 3 and 4, the separation of the ranges 302-304 is made at the point 220 shown in FIG. 2. It is at this point where the digital modulation control signal 208 generally reaches a 90-100% duty cycle, and additional increases in brightness are not achieved by increasing the duty cycle of the PWM control signal 208 since current is limited to around 6 mA in this range 302. This point 220 could represent any suitable brightness value and may vary depending on the LEDs 102 being used. The point 220 could, for instance, represent a brightness value of 20% or 25%. Above this point 220, an increase in current is used to achieve higher brightness, and current control is used to adjust the brightness of the LEDs 102.

By using digital modulation control in the lower brightness range 302 and current control in the higher brightness range 304, the control unit 106 can achieve significant efficiency gains, particularly in the lower range 302. This can help to reduce power consumption by the LEDs 102, such as by 20% or more. This is possible even though the LEDs 102 are producing the same amount of luminance.

Note that there might be a very small change in the white point of the light generated by the LEDs 102, but the change in white point (if it occurs) would typically be acceptable or hardly noticeable. Also note that while the above description describes using digital modulation control in the range 302 and current control in the range 304, adjustments to both the digital modulation and current control signals 208-210 could be made in both ranges 302-304. This may occur, for example, during the performance of compensation, when one or both of the digital modulation and current control signals 208-210 are adjusted to achieve the desired output brightness for the LEDs 102. However, as a general (non-binding) rule, the LED current would likely remain relatively constant within the range 302, and the digital modulation duty cycle would likely remain within a specified high range (such as 90-100%) within the range 304.

Although FIG. 2 illustrates one example of a digital modulation and current dimming control unit 106 for LEDs 102, various changes may be made to FIG. 2. For example, the functional division shown in FIG. 2 is for illustration only. Various components in FIG. 2 could be omitted, combined, or further subdivided and additional components could be added according to particular needs. As a specific example, each of the saturation units 216 and 228 could be divided into a saturation unit and a separate compensation unit. Also, as described below, compensation could be performed in only one of the paths 204-206. Although FIGS. 3 through 5 illustrate examples of characteristics of LED illumination using combined digital modulation and current dimming control, various changes may be made to FIGS. 3 through 5. For instance, the point 220 could represent any suitable brightness value, such as 20%, 25%, or 50%. Moreover, the maximum optical efficiency of the LEDs 102 may be achieved at a current other than 6 mA or 25% of their rated value, and the current through the LEDs 102 could increase to a maximum value other than 25 mA. In addition, the system might have several thresholds with different gains, which could be implemented in particular embodiments using look-up tables.

Figure 6:
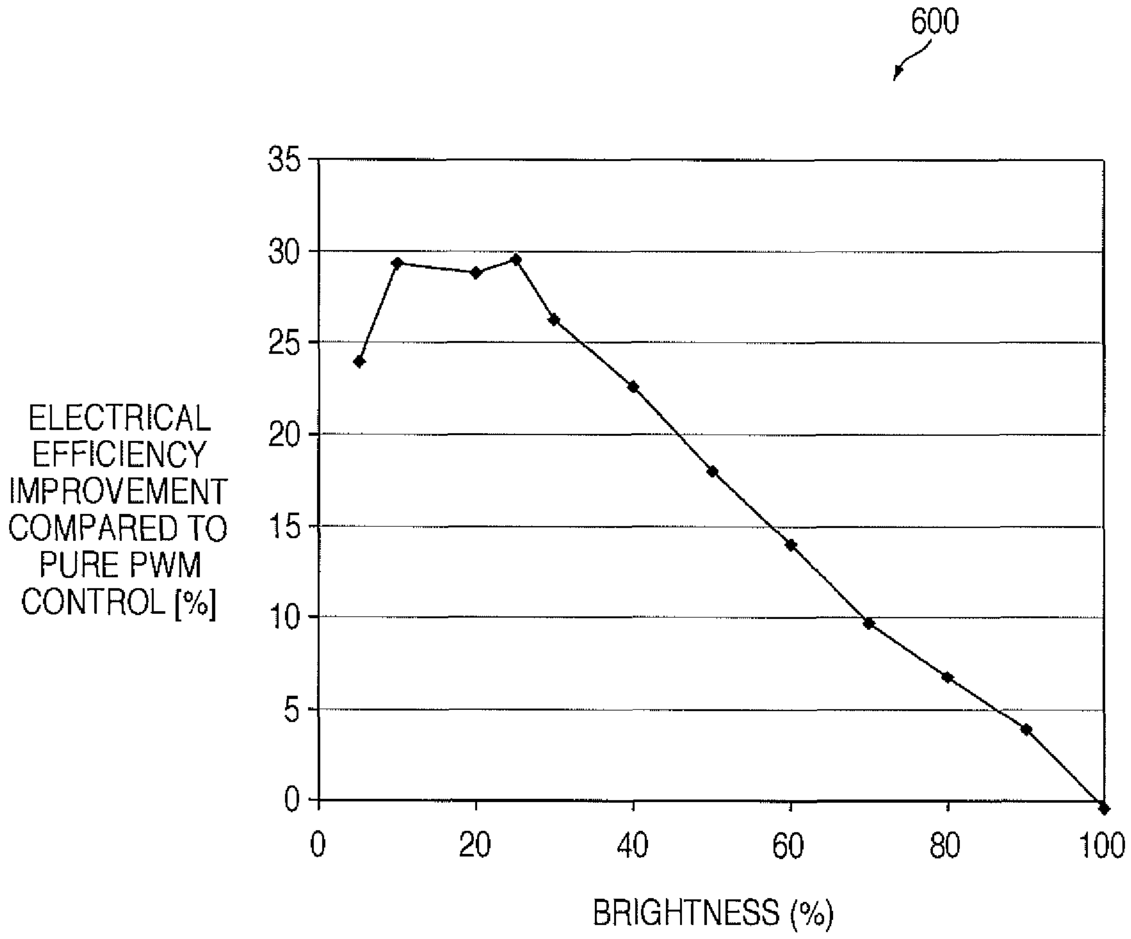

FIGS. 6 through 9B illustrate example compensation details for combined digital modulation and current dimming control according to this disclosure. As described above, compensation can be used to help ensure that the output brightness of the LEDs 102 is at least substantially related linearly to the input signal 202. FIG. 6 illustrates why compensation may be needed. In FIG. 6, a graph 600 shows the improvement in electrical efficiency that can be obtained when using a combination of digital modulation and current dimming control compared to pure PWM dimming control (which includes a change in threshold voltage). As shown in FIG. 6, the improvement in efficiency is not constant at all brightness values. Rather, the efficiency improvement generally increases towards the point 220, stabilizes somewhat, and drops after that.

One goal is typically to make the LED brightness substantially linearly related to the input signal 202. For example, if an input signal 202 with a 10% duty cycle is received, the LEDs 102 could ideally be at 10% brightness. However, different efficiency improvements at different brightness values may alter the relationship between current and brightness. For instance, an LED brightness of 100% might correspond to 100 mA of LED current, while an LED brightness of 50% (a 50% reduction in brightness) might correspond to 45 mA of LED current (a 55% reduction in current). This is because the LEDs 102 as shown in FIG. 6 have an efficiency improvement at 50% brightness and no efficiency improvement at 100% brightness, so less current is needed to obtain the desired 50% brightness. The overall system efficiency is also increased since LED threshold voltages are decreased when current is decreased, so the electrical power required for driving the LEDs 102 is decreased further.

Slope compensation can be used by the control unit 106 (or other component like the processing unit 108) so that the control signals 208-210 cause the LED brightness to be generally linear with the input signal 202. For example, current control could be used with brightness values above 25%. As shown in FIG. 6, the efficiency improvement drops in what appears to be a relatively linear manner from 25% to 100% brightness. That is, there is a relatively linear decrease in efficiency improvement as the brightness level increases from 25% to 100% brightness.

Because of this, slope compensation performed in the current control path 206 could adjust the current control signal 210. Alternatively (or in addition), slope compensation performed in the digital modulation control path 204 could adjust the digital modulation control signal 208. These adjustments can be used to help ensure that the LED brightness is substantially related linearly to the input signal 202. Note that the system could use linear or higher-order compensation to match the light output of the LEDs 102 to the input signal 202.

Figure 7:
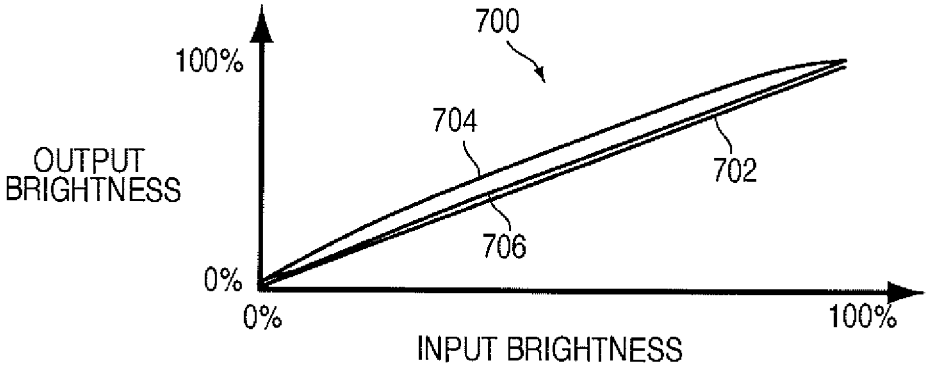
FIGS. 6 through 9B illustrate example compensation details for combined digital modulation and current dimming control according to this disclosure.

An example result of slope compensation is shown in FIG. 7, where a graph 700 plots the "input brightness" (the brightness as defined by the input signal 202) against the "output brightness" (the actual brightness of the LEDs 102). A line 702 identifies the exact linear relationship between the input brightness and the output brightness. A line 704 denotes a possible relationship between input and output brightness when using only digital modulation control over the entire range of brightness values. A line 706 denotes a possible relationship between input and output brightness when using combined digital modulation and current dimming control. As shown here, digital modulation control by itself may cause the output brightness to differ quite a bit from the expected brightness as defined by the linear relationship. However, combined digital modulation and current dimming control with slope compensation can help make the output brightness quite similar to the expected brightness as defined by the linear relationship.

Figure 8A:
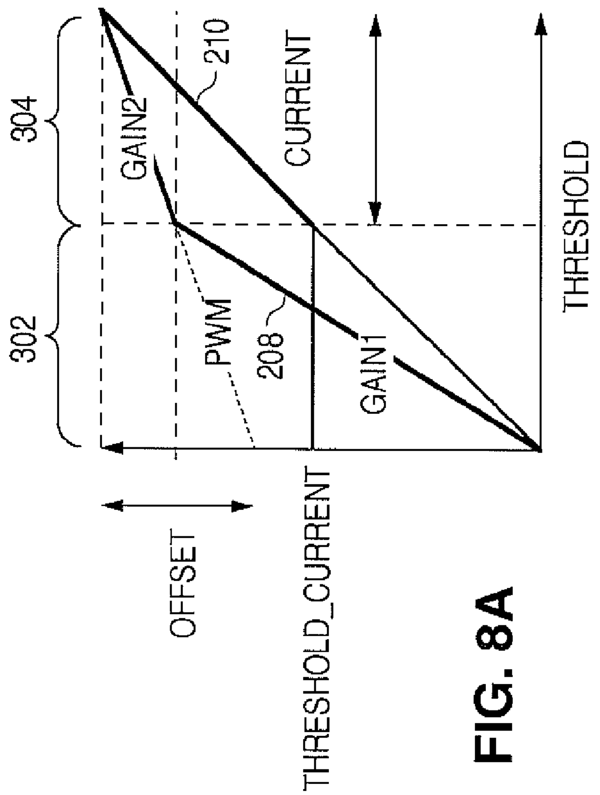
Figure 8B:
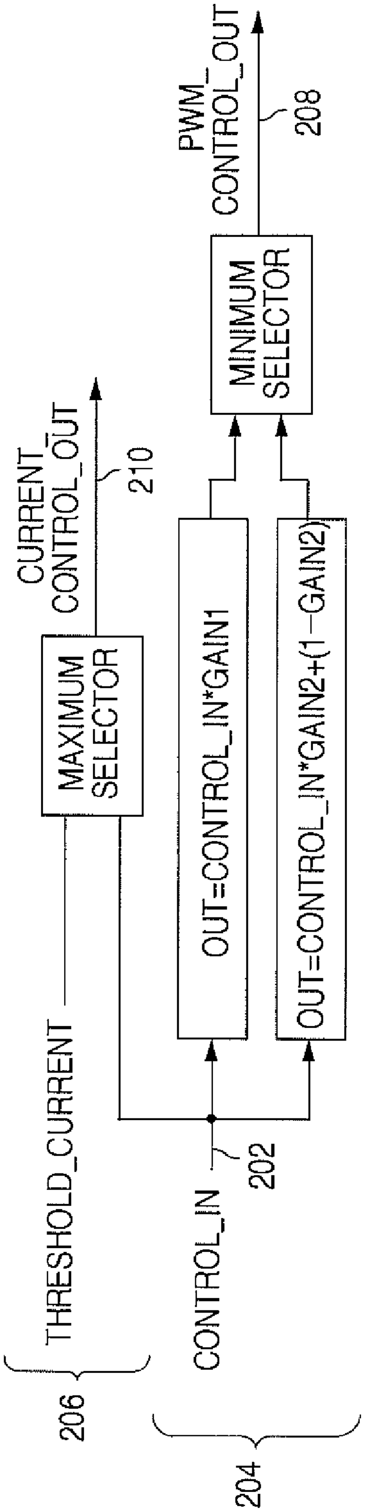

FIGS. 8A and 8B illustrate an example of slope compensation that could be performed in the digital modulation control path 204. As shown in FIG. 8A, within the lower brightness range 302, a gain Gain1 can be applied to an input signal 202, and a PWM control signal 208 increases linearly up to a specified value (such as 90%). The current control signal 210 may remain substantially constant during this period. Here, the LEDs 102 may be operating at maximum efficiency, and the brightness of the LEDs 102 is controlled by increasing or decreasing the duty cycle of the PWM control signal 208. The value of Gain1 can be based on the type of LEDs 102 being used and the efficiency improvement within this range 302.

Within the higher brightness range 304, the current control signal 210 increases substantially linearly in proportion with the input signal 202 to provide higher brightness. The PWM control signal 208 increases with a gain Gain2, where the slope of the PWM control signal 208 in this period is based on an offset from 100%. Again, the value of Gain2 and the offset can be based on the type of LEDs 102 being used and the efficiency improvement within this range 304. The adjustment to the duty cycle of the PWM control signal 208 during this period can help to compensate for decreasing efficiency as the brightness increases within the range 304.

FIG. 8B illustrates the logical operation of the control paths 204-206 to provide the compensation shown in FIG. 8A. As shown in FIG. 8B, the digital modulation control path 204 could generate a control signal 208 that is based on the smaller of (i) the input signal 202 multiplied by the gain Gain1 or (ii) the input signal 202 multiplied by the gain Gain2 plus the offset defined as (1−Gain2). The current control path 206 could generate a control signal 210 that is based on the larger of (i) a threshold current (such as 6 mA) or (ii) a current proportional to the input signal 202.

Figure 9A:
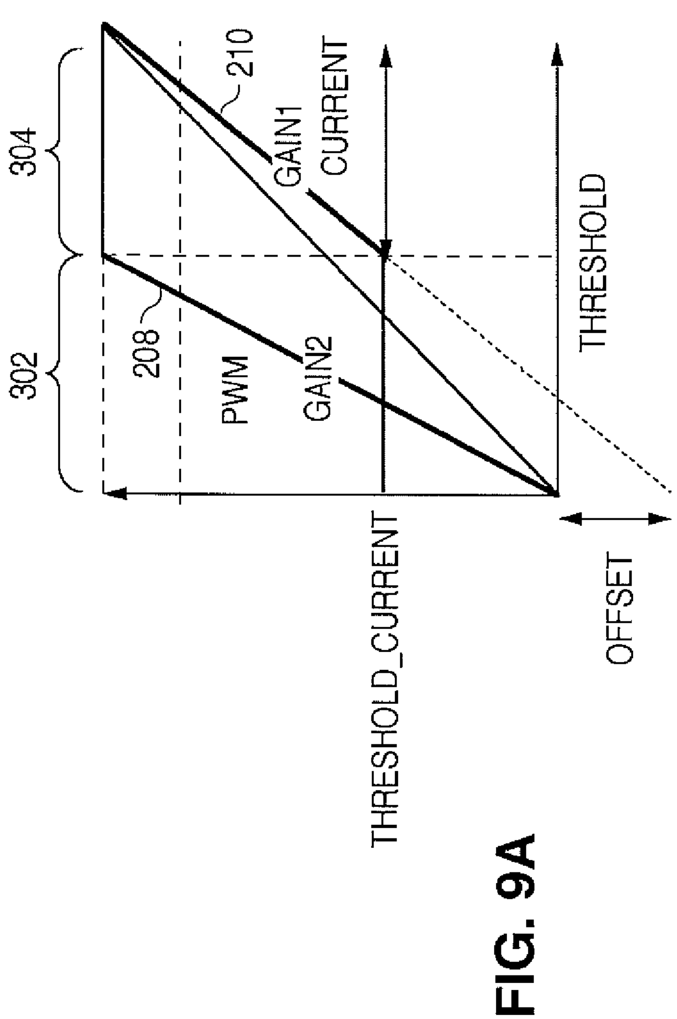
Figure 9B:
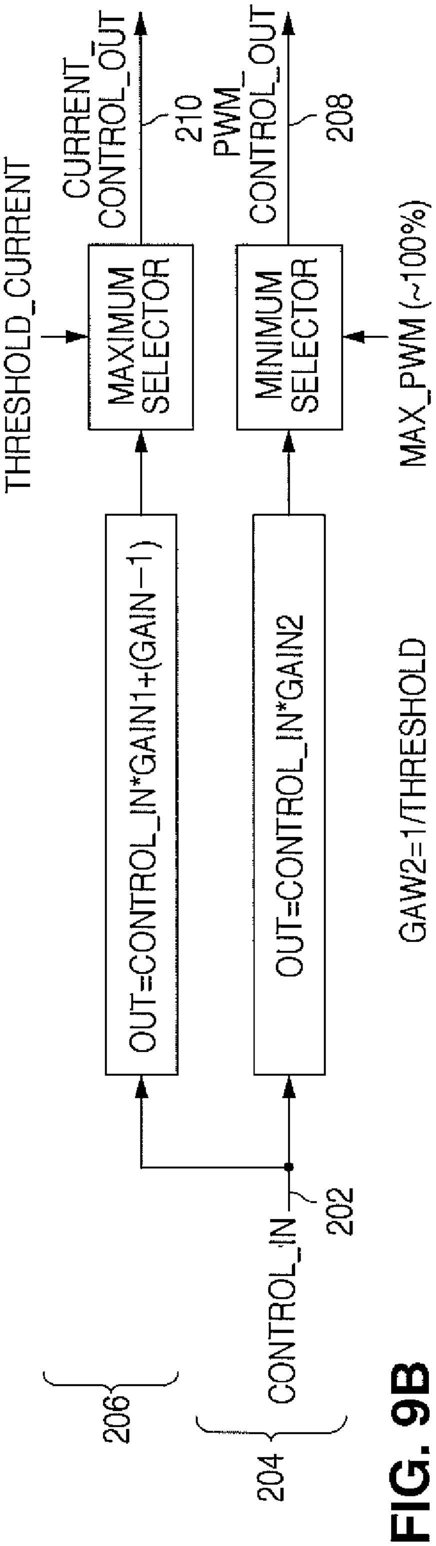

FIGS. 9A and 9B illustrate an example of slope compensation that could be performed in the current control path 206. As shown in FIG. 9A, within the lower brightness range 302, a gain Gain2 can be applied to an input signal 202, and a PWM control signal 208 increases linearly up to a maximum value (such as 100%). The current control signal 210 may remain substantially constant during this period.

Within the higher brightness range 304, the current control signal 210 increases with a gain Gain1, while the PWM control signal 208 remains substantially constant. The current control signal 210 does not increase proportionally to the input signal 202 but rather has a slope based on an offset. The value of Gain1, Gain2, and the offset can again be based on the type of LEDs 102 being used and the efficiency improvement.

FIG. 9B illustrates the logical operation of the control paths 204-206 to provide the compensation shown in FIG. 9A. As shown in FIG. 9B, the digital modulation control path 204 could generate a control signal 208 that is based on the smaller of (i) the input signal 202 multiplied by the gain Gain2 or (ii) a maximum PWM duty cycle (such as 100%). The current control path 206 could generate a control signal 210 that is based on the larger of (i) a threshold current (such as 6 mA) or (ii) the input signal 202 multiplied by the gain Gain1 plus the offset defined as (1−Gain1).

In either of these cases, the slope compensation can help to compensate for the efficiency improvements obtained by using a combination of digital modulation and current dimming control. Note that slope compensation could occur in either or both of the control paths 204-206. Also note that the precise slope compensation performed in the control unit 106 could vary depending on the implementation. For example, different LEDs 102 may have different efficiency increases when performing current dimming. As a result, the slope compensation could differ depending on which LEDs 102 are being used. As a particular example, one type of LED 102 may require a slope increase of 7.5%, while another type of LED 102 may require a slope increase of 10%. The amount of slope compensation could be customizable or programmable so that the same physical implementation of the control unit 106 could be used with various types of LEDs 102.

Using both digital modulation and current dimming can also increase the dynamic range of the control over LED brightness. One common limitation of PWM control is the minimum pulse width. However, by using current control over some range of brightness values, this increases the resolution of the PWM control, allowing the PWM control to make finer adjustments to the brightness of the LEDs 102. For example, there are 4,096 possible pulse widths in 12-bit PWM. Without current dimming, those 4,096 possible pulse widths would need to cover the entire range of brightness values from 0-100%. With current dimming used between brightness values of 50-100%, those 4,096 possible pulse widths would cover the range of brightness values from 0-50%, effectively providing a one-bit increase in resolution for the PWM control. With current dimming used between brightness values of 25-100%, those 4,096 possible pulse widths would cover the range of brightness values from 0-25%, effectively providing a two-bit increase in resolution for the PWM control. The use of current control therefore gives an additional degree of freedom, resulting in an improved dynamic range.

Although FIGS. 6 through 9B illustrate examples of compensation details for combined digital modulation and current dimming control, various changes may be made to FIGS. 6 through 9B. For example, the efficiency improvements shown in FIG. 6 and the compensations shown in FIGS. 8A through 9B are examples only. LEDs could have any other efficiency improvements and compensations depending, for example, on the type of LED used. Also, the lines 704-706 shown in FIG. 7 are for illustration only. Further, while linear gains are shown in FIGS. 8A through 9B, other types of gains could be used. For instance, the gain Gain2 in FIG. 8A could be flat at the lower end of the range 304 and increase non-linearly at the higher end of the range 304.

Figure 10:
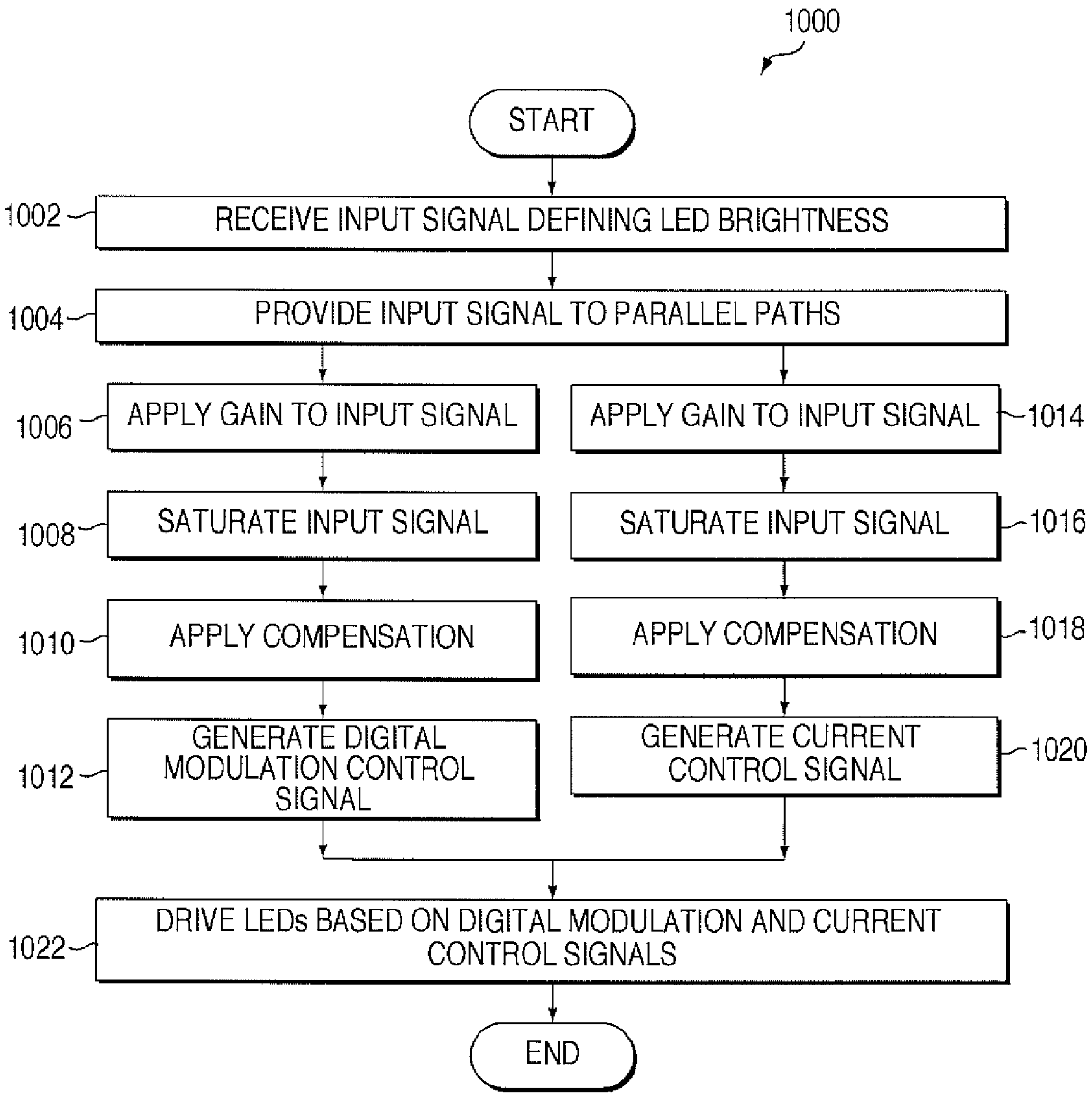
FIG. 10 illustrates an example method for combined digital modulation and current dimming control of LEDs according to this disclosure.

FIG. 10 illustrates an example method 1000 for combined digital modulation and current dimming control of LEDs according to this disclosure. As shown in FIG. 10, an input signal defining the brightness of one or more LEDs is received at step 1002. This could include, for example, the processing unit 108 or other component providing an input signal 202 with a duty cycle identifying the desired brightness of the LEDs 102. The input signal is provided to parallel control paths at step 1004. This could include, for example, providing the input signal 202 to a digital modulation control path 204 and a current control path 206. This could be done transparently from the perspective of the component providing the input signal 202. In other words, the component providing the input signal 202 need not take any special actions or even have knowledge of how the input signal 202 is being used.

In a first control path, a gain is applied to the input signal at step 1006, and the input signal is saturated at step 1008. This could include, for example, the gain unit 212 applying a gain to adjust a slope of the input signal 202. This could also include the saturation unit 216 saturating the signal at a specified point 220, which can represent the brightness value where control transitions between digital modulation control and current control. Compensation can be provided at step 1010. This could be done by the saturation unit 214 or another component, and the compensation could compensate for efficiency improvements in the LEDs 102. A digital modulation control signal is generated at step 1012. This could include, for example, the digital modulator 222 generating the digital modulation control signal 208, where the digital modulation control signal 208 has a duty cycle or other modulation characteristic defined by the input signal 202 as altered in the digital modulation control path 204.

In a second control path, a gain is applied to the input signal at step 1014, and the input signal is saturated at step 1016. This could include, for example, the gain unit 224 applying a gain to adjust a slope of the input signal 202 and the saturation unit 228 saturating the signal at a minimum value. Compensation can be provided at step 1018. This could be done by the saturation unit 228, which can compensate for efficiency improvements in the LEDs 102. A current control signal is generated at step 1020. This could include, for example, the current dimming unit 232 generating the current control signal 210, where the current control signal 210 is substantially constant at lower brightness values and increases for higher brightness values.

One or more LEDs are driven based on the digital modulation and current control signals at step 1022. This could include, for example, the LED driver 104 driving the LEDs 102 based on the digital modulation and current control signals 208-210. When in the lower brightness range 302, this could include driving the LEDs 102 with around 6 mA of current and a varying PWM duty cycle depending on the brightness. When in the higher brightness range 304, this could include driving the LEDs 102 with a variable amount of current depending on the brightness and maintaining a PWM duty cycle between 90-100%. The compensation allows adjustments to be made to either or both of these values to help obtain a substantially linear relationship between the input signal 202 and the LED output brightness.

Although FIG. 10 illustrates one example of a method 1000 for combined digital modulation and current dimming control of LEDs, various changes may be made to FIG. 10. For example, various steps in FIG. 10 may occur multiple times. Also, as noted above, compensation may or may not be used in both of the parallel paths.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A method comprising:

providing an input signal identifying a desired brightness for one or more light emitting diodes (LEDs) to first and second parallel control paths;

generating a digital modulation control signal using the first parallel control path including including adjusting the digital modulation control signal while maintaining the current control signal at a substantially constant value for a range of lower LED brightness values;

generating a current control signal using the second parallel control path, adjusting the current control signal while maintaining the digital modulation control signal at a maximum value or within a range of maximum values for a range of higher LED brightness values; and driving the one or more LEDs by transitioning between the digital modulation and current control signals based on the desired brightness.

2. The method of claim 1, further comprising:

performing compensation in at least one of the first and second parallel control paths to compensate for an increased efficiency of the one or more LEDs.

3. The method of claim 2, wherein performing the compensation comprises at least one of:

performing compensation in the first parallel control path to adjust the digital modulation control signal; and performing compensation in the second parallel control path to adjust the current control signal.

4. The method of claim 1, wherein the substantially constant value of the current control signal is associated with an LED current at which the one or more LEDs have a substantially maximum optical efficiency.

5. The method of claim 4, wherein:

the substantially constant value of the current control signal is associated with a current that is approximately 25% of the one or more LEDs' rated value;

the maximum value of the digital modulation control signal is associated with an approximately 100% duty cycle; and the range of maximum values of the digital modulation control signal is associated with a range of approximately 90% to approximately 100% duty cycles.

6. The method of claim 1, wherein generating the digital modulation control signal comprises:

applying a gain to the input signal to generate a gain-adjusted signal;

saturating the gain-adjusted signal at a maximum value associated with a threshold brightness to generate a saturated signal; and generating the digital modulation control signal based on the saturated signal.

7. The method of claim 1, wherein generating the current control signal comprises:

applying a gain to the input signal to generate a gain-adjusted signal;

saturating the gain-adjusted signal at a minimum value associated with a threshold brightness to generate a saturated signal; and performing current dimming control based on the saturated signal.

8. The method of claim 1, wherein the compensation varies depending on the one or more LEDs.

9. An apparatus comprising:

first and second parallel control paths, each parallel control path configured to receive an input signal identifying a desired brightness for one or more light emitting diodes (LEDs);

the first parallel control path configured to generate a digital modulation control signal, including adjusting the digital modulation control signal while maintaining the current control signal at a substantially constant value for a range of lower LED brightness values;

the second parallel control path configured to generate a current control signal, including adjusting the current control signal while maintaining the digital modulation control signal at a maximum value or within a range of maximum values for a range of higher LED brightness values; and a driver configured to drive the one or more LEDs by transitioning between the digital modulation and current control signals based on the desired brightness.

10. The apparatus of claim 9, wherein at least one of the first and second parallel control paths is configured to compensate for an increased efficiency of the one or more LEDs.

11. The apparatus of claim 9, wherein the substantially constant value of the current control signal is associated with an LED current at which the one or more LEDs have a substantially maximum optical efficiency.

12. The apparatus of claim 11, wherein:

the substantially constant value of the current control signal is associated with a current that is approximately 25% of the one or more LEDs' rated value;

the maximum value of the digital modulation control signal is associated with an approximately 100% duty cycle; and the range of maximum values of the digital modulation control signal is associated with a range of approximately 90% to approximately 100% duty cycles.

13. The apparatus of claim 9, wherein the first parallel control path comprises:

a gain unit configured to apply a gain to the input signal to generate a gain-adjusted signal;

a saturation unit configured to saturate the gain-adjusted signal at a maximum value associated with a threshold brightness to generate a saturated signal; and a modulator configured to generate the digital modulation control signal based on the saturated signal.

14. The apparatus of claim 9, wherein the second parallel control path comprises:

a gain unit configured to apply a gain to the input signal to generate a gain-adjusted signal;

a saturation unit configured to saturate the gain-adjusted signal at a minimum value associated with a threshold brightness to generate a saturated signal; and a current dimming unit configured to perform current dimming control based on the saturated signal.

15. The apparatus of claim 9, wherein at least one of:

the first parallel control path comprises a first slope compensator configured to perform slope compensation; and the second parallel control path comprises a second slope compensator configured to perform slope compensation.

16. The apparatus of claim 15, wherein at least one of the slope compensators is configured to provide one of multiple slope compensations depending on the one or more LEDs.

17. A system comprising:

one or more light emitting diodes (LEDs);

a control unit comprising:

first and second parallel control paths, each parallel control path configured to receive an input signal identifying a desired brightness for the one or more LEDs;

the first parallel control path configured to generate a digital modulation control signal, including adjusting the digital modulation control signal while maintaining the current control signal at a substantially constant value for a range of lower LED brightness values;

the second parallel control path configured to generate a current control signal, including adjusting the current control signal while maintaining the digital modulation control signal at a maximum value or within a range of maximum values for a range of higher LED brightness values; and a driver configured to drive the one or more LEDs by transitioning between the digital modulation and current control signals based on the desired brightness.

18. The system of claim 17, wherein at least one of the first and second parallel control paths configured to compensate for an increased efficiency of the one or more LEDs.

19. The system of claim 17, wherein:

the first parallel control path comprises:

a first gain unit configured to apply a first gain to the input signal to generate a first gain-adjusted signal;

a first saturation unit configured to saturate the first gain-adjusted signal at a maximum value associated with a threshold brightness to generate a first saturated signal; and a modulator configured to generate the digital modulation control signal based on the first saturated signal; and the second control path comprises:

a second gain unit configured to apply a second gain to the input signal to generate a second gain-adjusted signal;

a second saturation unit configured to saturate the second gain-adjusted signal at a minimum value associated with the threshold brightness to generate a second saturated signal; and a current dimming unit configured to perform current dimming control based on the second saturated signal.

20. The system of claim 17, wherein:

at least one of:

the first parallel control path comprises a first slope compensator configured to perform slope compensation; and the second parallel control path comprises a second slope compensator configured to perform slope compensation; and at least one of the slope compensators is configured to provide one of multiple slope compensations depending on the one or more LEDs.

* * * * *